(12) United States Patent
Hancock (10) Patent No.: US 9,360,920 B2
(45) Date of Patent: Jun. 7, 2016

(54) REDUCING POWER CONSUMPTION IN A FUSED MULTIPLY-ADD (FMA) UNIT OF A PROCESSOR

(75) Inventor: Chad D. Hancock, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 356 days.

(21) Appl. No.: 13/993,370

(22) PCT Filed: Nov. 21, 2011

(86) PCT No.: PCT/US2011/061716
§ 371 (c)(1),
(2), (4) Date: Jun. 12, 2013

(87) PCT Pub. No.: WO2013/077845
PCT Pub. Date: May 30, 2013

(65) Prior Publication Data
US 2013/0268794 A1    Oct. 10, 2013

(51) Int. Cl.
*G06F 1/32*     (2006.01)
*G06F 9/305*    (2006.01)
*G06F 7/483*    (2006.01)
*G06F 9/30*     (2006.01)
*G06F 7/544*    (2006.01)
*G06F 7/57*     (2006.01)
*G06F 7/509*    (2006.01)

(52) U.S. Cl.
CPC ............ *G06F 1/3234* (2013.01); *G06F 1/3206* (2013.01); *G06F 1/329* (2013.01); *G06F 1/3287* (2013.01); *G06F 7/483* (2013.01); *G06F 7/5443* (2013.01); *G06F 9/3001* (2013.01); *G06F 9/30014* (2013.01); *G06F 9/30036* (2013.01); *G06F 1/3243* (2013.01); *G06F 7/509* (2013.01); *G06F 7/57* (2013.01); *Y02B 60/1282* (2013.01); *Y02B 60/144* (2013.01)

(58) Field of Classification Search
CPC ..... G06F 1/3243; G06F 1/3287; G06F 1/329; G06F 7/483; G06F 7/509; G06F 7/57
USPC .................................. 713/300, 320, 322, 323
See application file for complete search history.

(56) References Cited

U.S. PATENT DOCUMENTS

| 8,037,118 B2 | 10/2011 | Quinnell et al. |
| 2004/0230774 A1 | 11/2004 | Schwarz et al. |
| 2004/0230849 A1* | 11/2004 | Dhong et al. ................. 713/320 |
| 2008/0071851 A1 | 3/2008 | Zohar |
| 2008/0256150 A1 | 10/2008 | Quinnell |
| 2010/0017635 A1 | 1/2010 | Barowski et al. |
| 2012/0072703 A1 | 3/2012 | Srinivasan |

OTHER PUBLICATIONS

Tomas Lang, et al., "Floating-Point Multiply-Add-Fuse with Reduced Latency," IEEE Transactions on Computers, vol. 53, No. 8, Aug. 2004, pp. 988-1003.

(Continued)

*Primary Examiner* — Michael J Brown
(74) *Attorney, Agent, or Firm* — Trop, Pruner & Hu, P.C.

(57) ABSTRACT

In one embodiment, the present invention includes a processor having a fused multiply-add (FMA) unit to perform FMA instructions and add-like instructions. This unit can include an adder with multiple segments each independently controlled by a logic. The logic can clock gate at least one segment during execution of an add-like instruction in another segment of the adder when the add-like instruction has a width less than a width of the FMA unit. Other embodiments are described and claimed.

19 Claims, 8 Drawing Sheets

(56) References Cited

OTHER PUBLICATIONS

Son Dao Trong, et al., "P6 Binary Floating-Point Unit," 18tj IEEE Symposium on Computer Arithmetic, Montpellier, France, Jun. 25-27, 2007, 10 pages.

Intel Corporation, "Intel Advanced Vecto Extensions Programming Reference," Aug. 2010, Document No. 319433-008, 21 pages.

Preiss, et al.; "Advanced Clockgating Schemes for Fused-Multiply-Add-Type Floating-Point Units"; 19th IEEE ISCA, pp. 48-56; Aug. 25, 2009.

International Search Report and Written Opinion for International Application No. PCT/US2011/061716 mailed Jul. 2, 2012.

* cited by examiner

| | $120_3$ | $120_2$ | $120_1$ | $120_0$ |
|---|---|---|---|---|
| | Bits 106:80 | Bits 79:51 | Bits 50:24 | Bits 23:0 |
| 1 | | Double Precision FMA | | |
| 2 | Single Precision FMA 1 | | Single Precision FMA 2 | |
| 3 | Double Precision Add | | Not Needed | |
| 4 | Single Precision Add 1 | Not Needed | Single Precision Add 2 | Not Needed |

REDUCING POWER CONSUMPTION IN A FUSED MULTIPLY-ADD (FMA) UNIT OF A PROCESSOR

BACKGROUND

Modern processors include various circuitry for performing operations on data. Typically, a processor is designed according to a given instruction set architecture (ISA). Many processors have a pipelined design that can be implemented as an in-order or out-of-order processor.

In either event, instructions are obtained via front end units, which process the instructions and place them in a form to be recognized by further components of the pipeline. Typically, so-called macro-instructions are broken up into one or more micro-instructions or uops. These uops may then be executed in different execution units of a processor. That is, many processors include multiple execution units including arithmetic logic units, address generation units, floating-point units and so forth.

One common execution unit is a multiply-add unit, which may be in the form of a fused multiply-add (FMA) unit. In general, a FMA unit can perform an operation on three incoming operands to first multiply two of the operands and then accumulate the product with the third operand. Some processors use such a unit to perform more simple mathematical operations such as additions, subtractions and multiplications by appropriate selection of the third operand or routing of operands and results via selection circuitry. Accordingly, in many processors a FMA unit may form the backbone of the execution units and may be a key circuit in determining the frequency, power and area of the processor. In addition, FMA units can be heavily used in certain applications such as graphics and many scientific and engineering applications. Thus these units should be made to be as efficient in area, power consumption, and processing speed as possible.

DETAILED DESCRIPTION

To provide for increased compute capabilities, embodiments can combine functional units into a fused multiply-add (FMA) unit. In general, this FMA unit includes a multiplier and an adder, and further includes a single rounder. In this way computing operations, including a fused multiply add operation, namely an Ax+B operation, can be performed more efficiently. This FMA unit can be of a relatively wide data width to accommodate operands of a wider width such as vector-size values. For example, in one embodiment this FMA unit can receive 64-bit operands and perform FMA operations on them.

In some implementations, this FMA unit may replace independent multiplication and addition units. Accordingly, the FMA unit can further perform multiply operations and addition-like operations. As used herein, the terms "addition-like" and "add-like" operations include, in addition to an addition operation, a subtraction operation, a minimum function, a maximum function and others such as integer-to-floating point, and floating point-to-integer conversions, as well as double-to-single precision and single-to-double precision conversions, and floating point compare instructions. Because embodiments provide for the ability to handle smaller-width operations in this FMA unit, a controller or other logic can further provide for control mechanisms to reduce power consumption in performing such operations on smaller-width data. In this way, so-called legacy instructions such as single precision additions, double precision additions and so forth can be performed in the FMA unit using no greater power than that consumed in an independent adder unit of a smaller width.

While the scope of the present invention is not limited in this regard, in many implementations the FMA unit may be compliant for operands of a given format, e.g., a given Institute of Electrical and Electronics Engineers (IEEE) standard such as a floating point (FP) representation for performing floating-point multiply accumulate operations. Furthermore, a given implementation may be used to handle various types of incoming data, including operands that can be of single and double precision floating point format.

In various embodiments, an ISA may provide multiple user-level FMA instructions. Such FMA instructions can be used to perform fused multiply-add operations (including fused multiply-subtract and other varieties) on packed (e.g., vector) and/or scalar data elements of the instruction operands. Different FMA instructions may provide separate instructions to handle different types of arithmetic operations on the three source operands.

In one embodiment, FMA instruction syntax can be defined using three source operands, where the first source operand is updated based on the result of the arithmetic operations of the data elements. As such, the first source operand may also be the destination operand. For example, an instruction format of: opcode, x1, x2, x3 may be present, where the opcode corresponds to one of multiple user-level FMA instructions to perform a given arithmetic operation, and x1-x3 correspond to operands to be processed in the operation.

The arithmetic FMA operation performed in an FMA instruction can take one of several forms, e.g.:

$r=(x*y)+z;$ $r=(x*y)-z;$ $r=-(x*y)+z;$ or $r=-(x*y)-z.$

In an embodiment, packed FMA instructions can perform eight single-precision FMA operations or four double-precision FMA operations with 256-bit vectors. Scalar FMA instructions may only perform one arithmetic operation on a low order data element, when implemented using vector registers. The content of the rest of the data elements in the lower 128-bits of the destination operand is preserved, while the upper 128 bits of the destination operand may be filled with zero.

In an embodiment, an arithmetic FMA operation of the form, r=(x*y)+z, takes two IEEE-754-2008 single (double) precision values and multiplies them to form an intermediate value. This intermediate value is added to a third single (double) precision value and rounded to produce a single (double) precision result. Of course, different rounding modes and precisions may be implemented in different embodiments.

Execution units of a processor may include logic to perform integer and floating point operations. Microcode (ucode) read only memory (ROM) can store microcode for certain macro-instructions, including vector multiply-add instructions, which may be part of a packed instruction set. By including packed instructions in an instruction set of a general-purpose processor, along with associated circuitry to execute the instructions, the operations used by many multimedia applications may be performed using packed data in a general-purpose processor. Thus, many multimedia applications can be accelerated and executed more efficiently by using the full width of a processor's data bus for performing operations on packed data. This can eliminate the need to transfer smaller units of data across the processor's data bus to perform one or more operations one data element at a time. In some embodiments, the multiply-add instruction can be implemented to operate on data elements having sizes of byte, word, doubleword, quadword, etc., as well as datatypes, such as single and double precision integer and floating point datatypes.

Some single instruction multiple data (SIMD) and other multimedia types of instructions are considered complex instructions. Most floating point-related instructions are also complex instructions. As such, when an instruction decoder encounters a complex macro-instruction, the microcode ROM is accessed at the appropriate location to retrieve the microcode sequence for that macro-instruction. The various pops for performing that macro-instruction are communicated to, e.g., an out-of-order execution logic, which may have buffers to smooth out and re-order the flow of micro-instructions to optimize performance as they flow through the pipeline and are scheduled for execution. Allocator logic allocates buffers and resources that each uop needs in order to execute. Renaming logic may rename logical registers onto entries in a register file (e.g., physical registers).

In one embodiment, vector instructions can be executed on various packed data type representations. These data types may include a packed byte, a packed word, and a packed doubleword (dword) for 128 bits wide operands. As an example, a packed byte format can be 128 bits long and contain sixteen packed byte data elements. A byte is defined here as 8 bits of data. Information for each byte data element is stored in bit 7 through bit 0 for byte 0, bit 15 through bit 8 for byte 1, bit 23 through bit 16 for byte 2, and finally bit 120 through bit 127 for byte 15.

Generally, a data element is an individual piece of data that is stored in a single register or memory location with other data elements of the same length. In some packed data sequences, the number of data elements stored in a register can be 128 bits divided by the length in bits of an individual data element. Although the data types can be 128 bit long, embodiments of the present invention can also operate with 64 bit wide or other sized operands.

It will be appreciated that packed data formats may be further extended to other register lengths, for example, to 96-bits, 160-bits, 192-bits, 224-bits, 256-bits or more. In addition, various signed and unsigned packed data type representations can be handled in multimedia registers according to one embodiment of the present invention.

Figure 1:
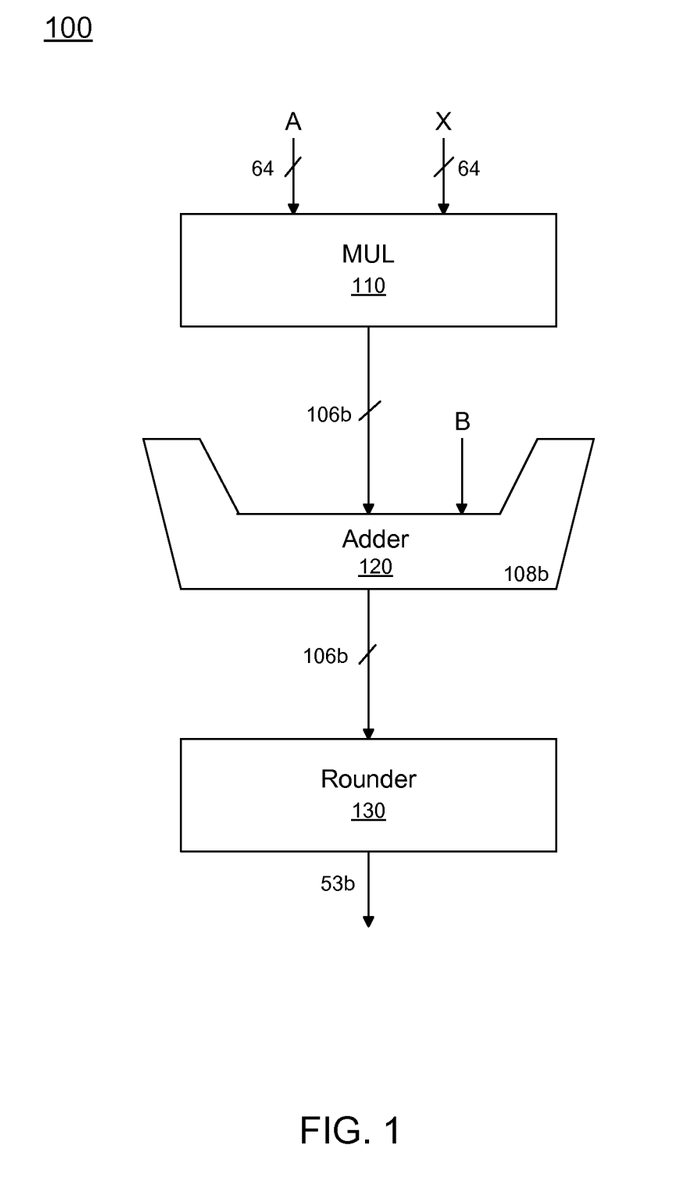
FIG. 1 is a block diagram of a multiply-add unit in accordance with an embodiment of the present invention.

Referring now to FIG. 1, shown is a block diagram of a multiply-add unit in accordance with an embodiment of the present invention. As shown in FIG. 1, FMA unit 100 includes a multiplier 110, an adder 120, and a rounder 130. In the embodiment shown in FIG. 1, FMA unit 100 can be configured to receive multiple source operands in multiplier 110. In the embodiment shown, two source operands, e.g., each of 64 bit widths can be received, although the scope of the present invention is not limited in this regard. For example, in other embodiments, the source operands may be 32 bits or 128 bits.

Accordingly, multiplier 110 can generate a product having a width of, e.g., 106 bits, assuming that the inputs for the source operands are 53-bit mantissas of a double precision value. Accordingly, adder 120 is configured to have a width of 108 bits to accommodate this incoming product. In addition, adder 120 is further configured to receive an additional source operand, which in some embodiments also can be 64 bits. Adder 120 thus generates a sum that can be 106 bytes, which can be provided to a rounder 130 that in turn generates a rounded output, e.g., of 53 bits.

To perform a fused multiply add operation on this hardware, two source operands, corresponding to a coefficient A and a variable x, can be provided to multiplier 110. In turn, a product of these values can be added with a third source operand (B) in adder 120 to thus obtain a sum that can be rounded in rounder 130. The result can thus correspond to a value of Ax+B. In addition to performing such fused multiply adds, this hardware is further configured to perform multiplications in multiplier 110 and further to perform add-like operations in adder 120.

Different types of instructions can be accordingly executed in FMA unit 100. Although the scope of the present invention is not limited in this regard, in one embodiment such instructions can include double precision FMA instructions, single precision FMA instructions, double precision add-like instructions and single precision add-like instructions. In some embodiments, the hardware can be configured to perform one double precision FMA instruction at a time or to perform two single precision FMA instructions concurrently. Similarly, the hardware can be configured to perform one double precision add-like instruction or to perform two single precision add-like instructions concurrently.

With regard to add-like instructions, to reduce power consumption such that even though a wider data path exists, no greater power consumption occurs than for a smaller-width adder, embodiments provide techniques to clock gate at least portions of the FMA unit when not needed for a particular add-like instruction execution. To this end, at least certain substructures within FMA unit 100 can be partitioned such that only certain partitions are enabled based on the type of instruction to be executed. In particular embodiments, adder 120 can be partitioned into multiple portions. Although the scope of the present invention is not limited in this regard, in an embodiment in which the adder is 108 bits wide, it can be partitioned into quadrants. Note that these quadrants need not be equally sized, and two of the quadrants can be of greater size to enable execution of a double precision add-like instruction in these two quadrants.

Although shown at this high level in the embodiment of FIG. 1, understand that additional circuitry can be present. For example, various multiplexers can be provided to enable transmission of source operands to the appropriate locations as well as to route partial results through FMA unit 100 to thus generate a final output.

Figure 2:
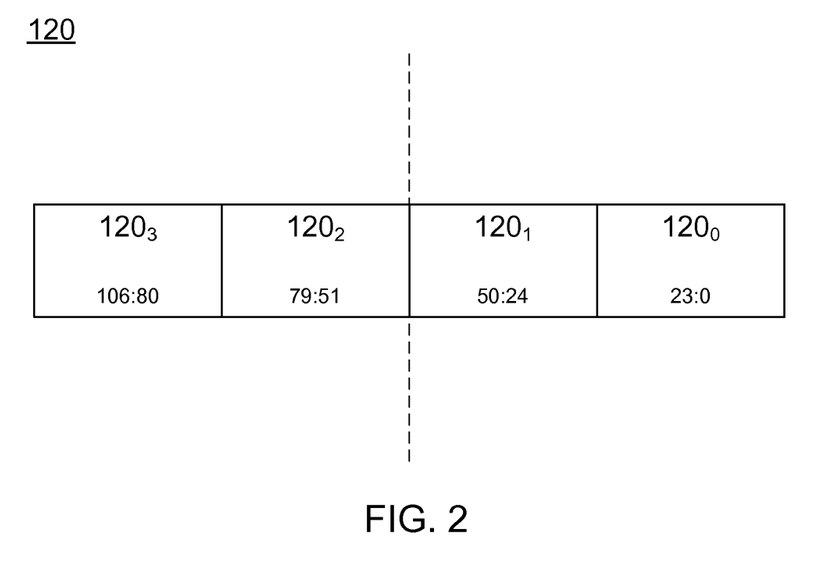
FIG. 2 is a block diagram of the partitioning of an adder in accordance with an embodiment of the present invention.

Referring now to FIG. 2, shown is a block diagram of the partitioning of an adder in accordance with an embodiment of the present invention. Specifically, in FIG. 2 adder 120 is partitioned into four quadrants or segments $120_0$-$120_3$. As seen, a different amount of bits can be present in these partitions. Specifically, segment $120_0$ may include 24 bits, namely bits [23:0]. Similarly, segments $120_1$ can include bits [24:50]. And in turn segment $120_2$ includes bits [51:79], and segment $120_3$ includes bits [80:106].

Although details of the adder segments are not shown, understand that they may form a floating point adder including sequentials such as latches, flops, shifting structures, adders and logic circuitry. By separating the adder into segments, each segment can be coupled to receive an independent clock controlled by independent enable signals. In turn, these enable signals for the clocks can be controlled by a tracking mechanism, as discussed further below. Although shown with this particular segmentation in the embodiment of FIG. 2, understand the scope of the present invention is not limited in this regard.

To provide for power management to realize reduced power consumption in executing instructions that use less than the full width of the hardware of FMA unit 100, embodiments can provide one or more trackers or state machines each associated with a different partition of the hardware to determine whether it is possible to clock gate or otherwise reduce power consumption to the corresponding partition. Specifically with regard to the partitioning of FIG. 2, each segment can be associated with a given tracker or state machine that enables provision of a clock signal to the corresponding segment. More specifically, in order to prevent an increase in dynamic power to support legacy add-like instructions, these state machines can be configured to only toggle portions of the hardware needed to support an add-like instruction when the previous instruction executed for that portion was also an add-like instruction.

Figure 3:
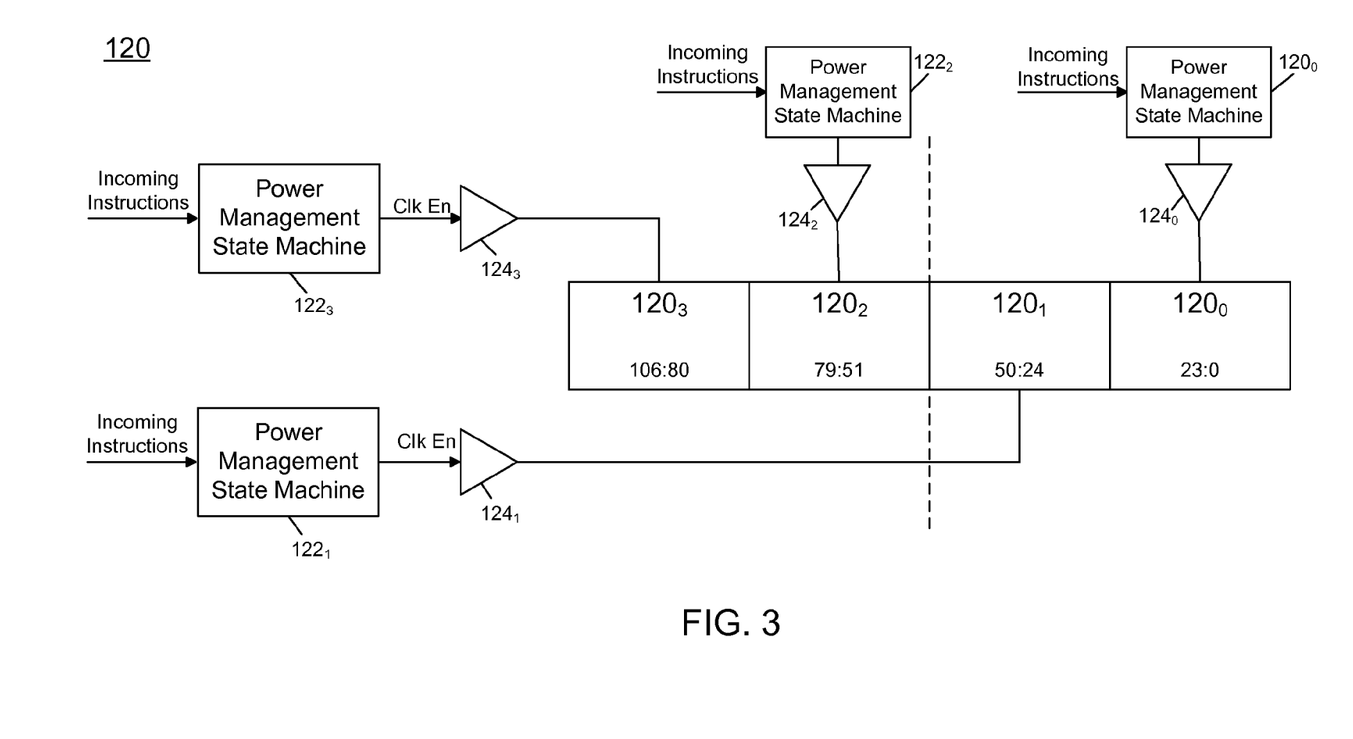
FIG. 3 is a block diagram of further details of an adder partitioning in accordance with an embodiment of the present invention.

Referring now to FIG. 3, shown is a block diagram of further details of an adder partitioning in accordance with an embodiment of the present invention. As seen in FIG. 3, each adder segment 120 can receive a clock signal to thus toggle its sequentials and other logic. More specifically, each segment 120 can receive a corresponding clock signal from a given clock driver $124_0$-$124_3$. In turn, each of these clock drivers receives a clock enable signal from a corresponding power management state machine $122_0$-$122_3$. Each of these state machines can be configured to receive an incoming instruction stream which can correspond, in one embodiment, to uops that are to be executed within the FMA unit and to execute a state machine or other logic responsive to the incoming instruction stream to thus cause the corresponding adder segment to be powered on when it is needed for execution of an instruction or to power it on to clear out potentially dirty data after execution of an FMA instruction as described herein. Otherwise, the clock enable signal is not active and instead the corresponding adder portion can be clock gated, thus reducing dynamic power consumption. Note that although the embodiment of FIG. 3 shows four individual state machines, understand the scope of the present invention is not limited in this regard and in some embodiments a single global state machine may be provided. Furthermore, note that additional portions of the FMA logic can be clock gated as appropriate. For example, another tracker can be associated with the multiplier to thus clock gate the multiplier during execution of add-like instructions. Similarly, for implementations in which multiple clock cycles are consumed to execute an FMA or add-like instruction, embodiments may clock gate the rounder until it is needed for performing a rounding operation. Although shown at this high level in the embodiment of FIG. 3, understand the scope of the present invention is not limited in this regard.

Accordingly, the state machine can track previously executed operations to determine what portions of the four sequential clocks are to be used for the current instruction. If clocks are not toggled there is risk of data from previously executed operations corrupting the result of an operation that is gating some of these regions. Therefore the first execution of an add-like operation toggles all of the clocks for all of the segments, after which the state machines can then clock gate off regions for consecutive add-like operations, saving dynamic power, which would otherwise show an increase from a smaller width adder, due to widening the data path. This state machine thus determines when it is safe to clock gate regions of the data path when add-like operations are performed. As such, legacy-like dynamic power can be realized for floating point add-like operations while increasing the width of a floating point mantissa data path in order to support FMA instructions in the FMA unit.

Figure 4:
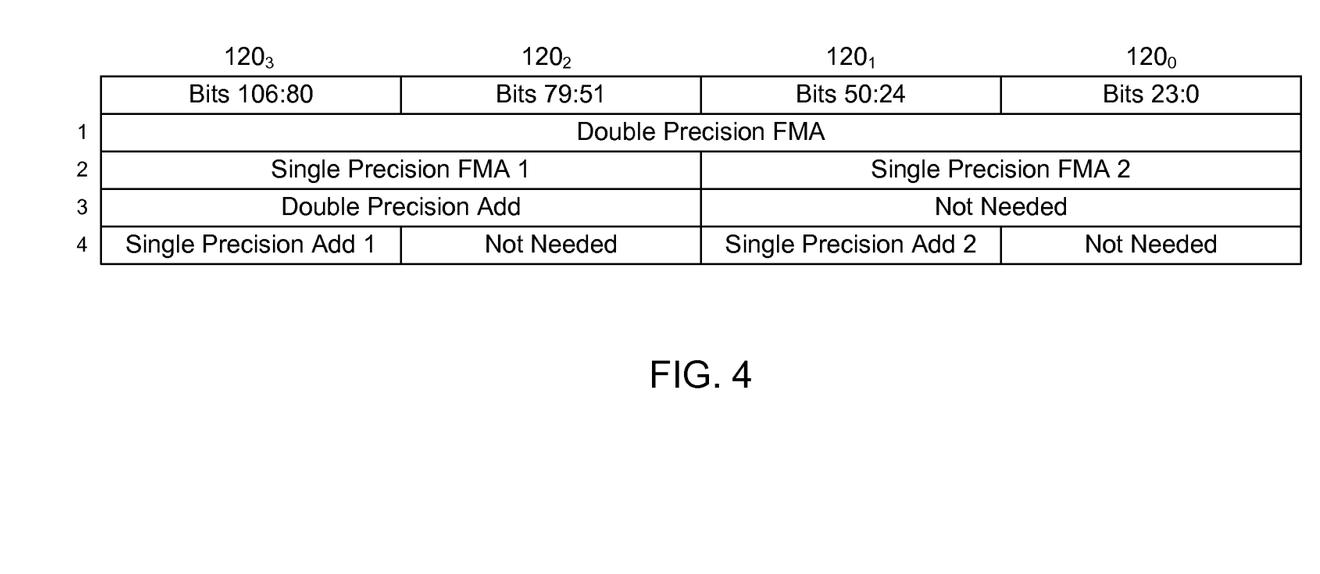
FIG. 4 is an illustration of multiple adder segments and their corresponding activity state for different instruction types in accordance with one embodiment of the present invention.

FIG. 4 is an illustration of multiple adder segments and their corresponding activity state for different instruction types. Specifically as shown in FIG. 4, adder 120 includes a plurality of segments $120_0$-$120_3$. FIG. 4 further shows a series of instructions that can be executed in an FMA unit, including a partitioned adder in accordance with an embodiment of the present invention. Each instruction or multiple instructions of rows 1-4 of FIG. 4 can be performed in one or more clock cycles, depending on a given design. When performing a double precision FMA instruction as shown in row 1, all of the segments are to be used and accordingly, all segments are enabled. Similarly, to perform multiple independent single precision FMA instructions concurrently as shown in row 2, all segments can be enabled.

Instead for performing a double precision add instruction shown in row 3, in the embodiment shown in FIG. 4 only segments $120_2$ and $120_3$ can be enabled. In one embodiment if this double precision addition instruction follows from the FMA instructions shown in FIG. 4, the entire segments $120_0$-$120_3$ can be enabled to thus toggle or clear out any dirty bits within the entire width of the data path, in one embodiment. However, it is also possible to not enable segments $120_0$ and $120_1$, as in the embodiment of FIG. 4, cross talk between the lower half and the higher half of the data path is prevented. Such operation can be done by qualifying all signals that fan into the separate high data path segments $120_2$ and $120_3$ with appropriate enable signals. Thus in such embodiments for double precision add instructions the lower half of the data path (e.g., segments $120_0$ and $120_1$) need not be enabled to clear it out. Of course, similar operations between the two segments in each half of the data path could also be performed.

At this point, all of the segments of the adder have been enabled for an add-like instruction following an FMA instruction. Accordingly, the state machines can be configured to only enable the corresponding segment if it is needed for execution of instruction. Thus, for execution of the concurrent single precision add instructions of row 4 in adder segments $120_1$ and $120_3$, only those segments can be clock enabled and segments $120_0$ and $120_2$ can be clock gated, thus reducing power consumption. Note that with regard to FIG. 4 although particular segments of the adder are shown to handle certain instructions of less than the full width of the adder, understand that in different implementations other segments can be enabled to perform such instructions.

Figure 5:
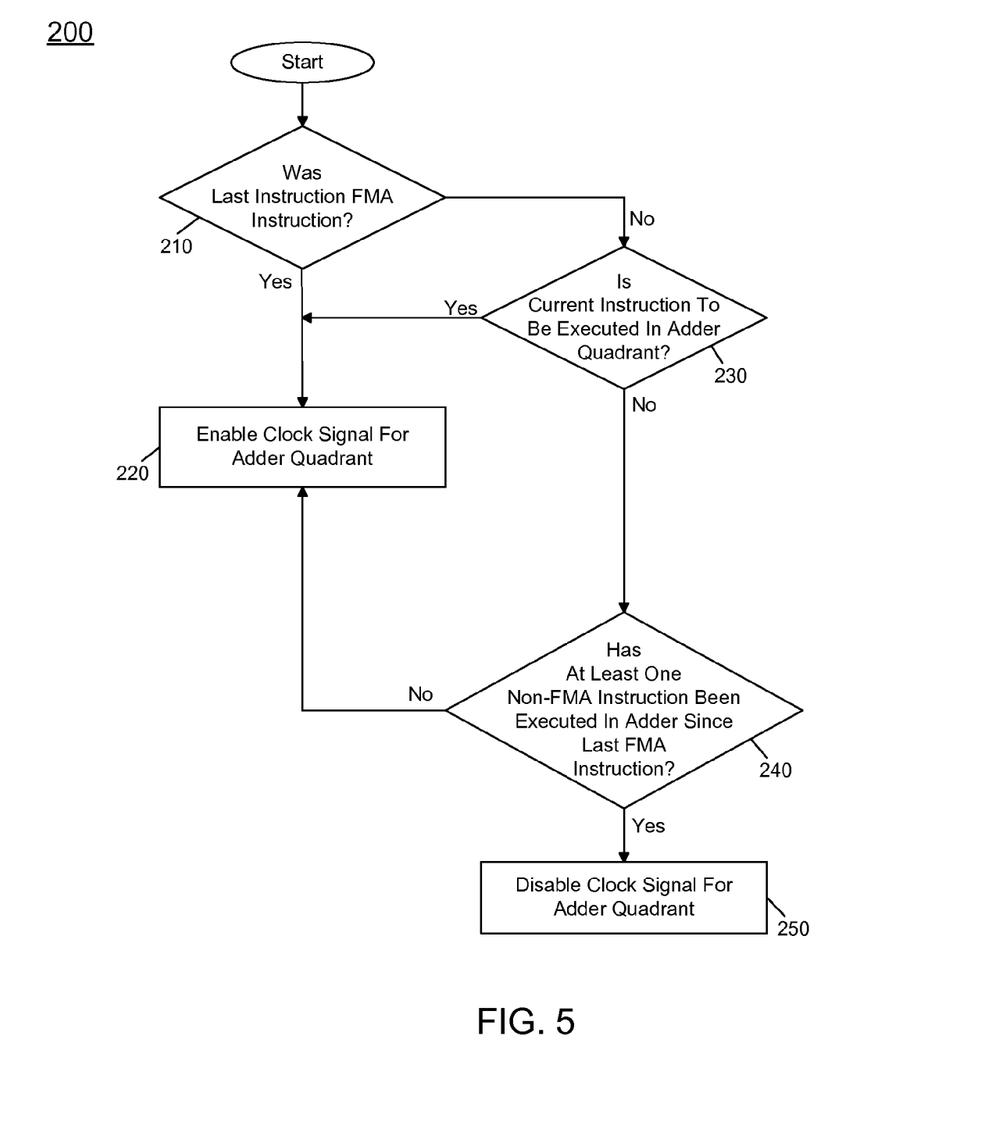
FIG. 5 is a flow diagram of execution of a state machine in accordance with an embodiment of the present invention.

Thus in general, the tracker or state machine can be configured to toggle or clock a given partition or segment of the adder when it is needed for execution of an instruction. Furthermore, the state machine can be configured to also clock a segment following an FMA operation such that any dirty data within the segment is cleared so that later operations do not become corrupted. Referring now to FIG. 5, shown is a flow diagram of execution of a state machine in accordance with an embodiment of the present invention. As shown in FIG. 5, method 200 can be performed independently in each state machine associated with a different one of the adder segments. At diamond 210 it can be determined whether the last instruction was an FMA instruction. To this end, each state machine can be coupled to receive the incoming instruction stream for analysis.

In one embodiment, the determination of whether the last instruction was a FMA instruction can be accommodated in different manners. For example, a last FMA flag can be set for when the previous instruction was an FMA instruction. This flag can thus be reset upon receipt of a non-FMA instruction. Or the state machine can be associated with a last instruction storage such as a register or buffer to store the last instruction so that instruction type can be determined.

If at diamond 210 it is determined that the last instruction was an FMA instruction, control passes to block 220 where the clock for the quadrant can be enabled. Accordingly, a given quadrant is powered on, and by way of powering this quadrant on, any dirty value present in the quadrant of the adder can be cleared. Still referring to FIG. 5 if instead it is determined that the last instruction was not an FMA instruction, control passes to diamond 230 to determine whether the current instruction is to be executed in the corresponding adder segment. Although the scope of the present invention is not limited in this regard, in one embodiment this determination can be based on information associated with the instruction such as a given uop or other instruction information. Note that this determination can be different for each of the state machines, as for certain smaller-width instructions such as legacy instructions, the instruction may not need to use all quadrants. If the instruction is to be executed in the given quadrant, control passes to block 220 to enable the clock signal. Otherwise, control passes to diamond 240.

At diamond 240 it can be determined whether at least one non-FMA instruction has been executed in the adder quadrant since the last FMA instruction. Although the scope of the present invention is not limited in this regard, in one embodiment the state machine can include a safe flag to indicate that a previous non-FMA instruction has been executed. When set, this indicates the previous execution and accordingly, control passes to block 250 where the clock signal can be disabled for the given adder quadrant. Otherwise if a previous non-FMA instruction has not been executed in the adder since the last FMA instruction, control passes to block 220 for enabling the clock signal to thus toggle the sequentials and other circuitry within the adder quadrant to clear it out. From this point forward, the quadrant need not be powered on unless it is needed for execution of an instruction. Accordingly, in the embodiment described here, the safe flag can thus be set to indicate that it is safe to allow the quadrant to be powered off when not being used.

Figure 6:
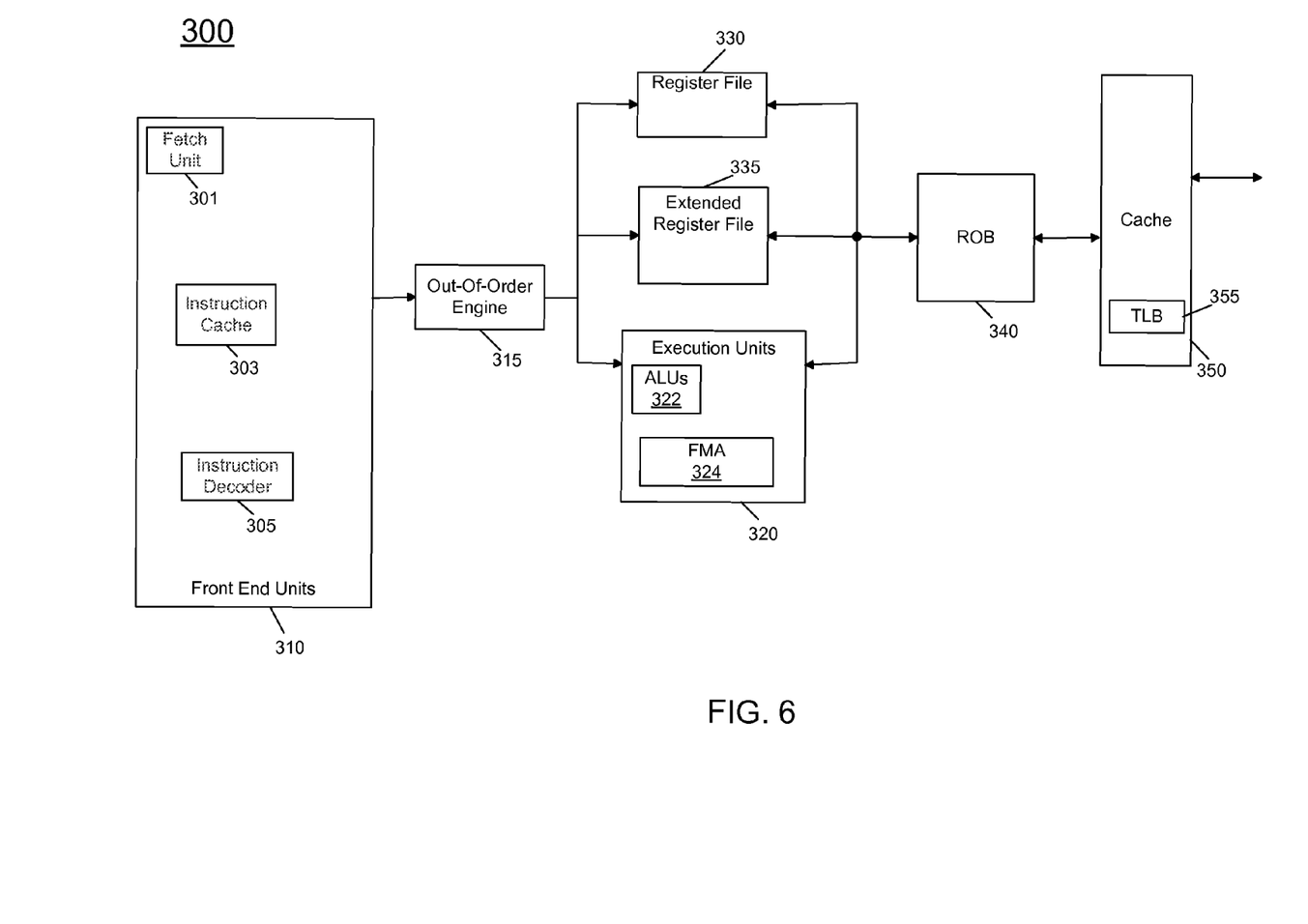
FIG. 6 is a block diagram of a processor core in accordance with one embodiment of the present invention.

Embodiments can be implemented in many different systems. For example, embodiments can be realized in a processor such as a multicore processor. Referring now to FIG. 6, shown is a block diagram of a processor core in accordance with one embodiment of the present invention. As shown in FIG. 6, processor core 300 may be a multi-stage pipelined out-of-order processor. Processor core 300 is shown with a relatively simplified view in FIG. 6 to illustrate various features used in connection with a FMA unit in accordance with an embodiment of the present invention.

As shown in FIG. 6, core 300 includes front end units 310, which may be used to fetch instructions to be executed and prepare them for use later in the processor. For example, front end units 310 may include a fetch unit 301, an instruction cache 303, and an instruction decoder 305. In some implementations, front end units 310 may further include a trace cache, along with microcode storage as well as a micro-operation storage. Fetch unit 301 may fetch macro-instructions, e.g., from memory or instruction cache 303, and feed them to instruction decoder 305 to decode them into primitives such as micro-operations for execution by the processor.

Coupled between front end units 310 and execution units 320 is an out-of-order (OOO) engine 315 that may be used to receive the micro-instructions and prepare them for execution. More specifically OOO engine 315 may include various buffers to re-order micro-instruction flow and allocate various resources needed for execution, as well as to provide renaming of logical registers onto storage locations within various register files such as register file 330 and extended register file 335. Register file 330 may include separate register files for integer and floating point operations. Extended register file 335 may provide storage for vector-sized units, e.g., 256 or 512 bits per register.

Various resources may be present in execution units 320, including, for example, various integer, floating point, and single instruction multiple data (SIMD) logic units, among other specialized hardware. For example, such execution units may include one or more arithmetic logic units (ALUs) 322. In addition, a FMA unit 324 may be present to generate a final result of a FMA or other instruction scheduled to the unit. In various embodiments, the unit may include a tracker to clock gate portions of the adder as described above.

When operations are performed on data within the execution units, results may be provided to retirement logic, namely a reorder buffer (ROB) 340. More specifically, ROB 340 may include various arrays and logic to receive information associated with instructions that are executed. This information is then examined by ROB 340 to determine whether the instructions can be validly retired and result data committed to the architectural state of the processor, or whether one or more exceptions occurred that prevent a proper retirement of the instructions. Of course, ROB 340 may handle other operations associated with retirement.

As shown in FIG. 6, ROB 340 is coupled to cache 350 which, in one embodiment may be a low level cache (e.g., an L1 cache) and which may also include TLB 355, although the scope of the present invention is not limited in this regard. Also, execution units 320 can be directly coupled to cache 350. From cache 350, data communication may occur with higher level caches, system memory and so forth. Note that while the implementation of the processor of FIG. 6 is with regard to an out-of-order machine such as of a so-called x86 ISA architecture, the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 7:
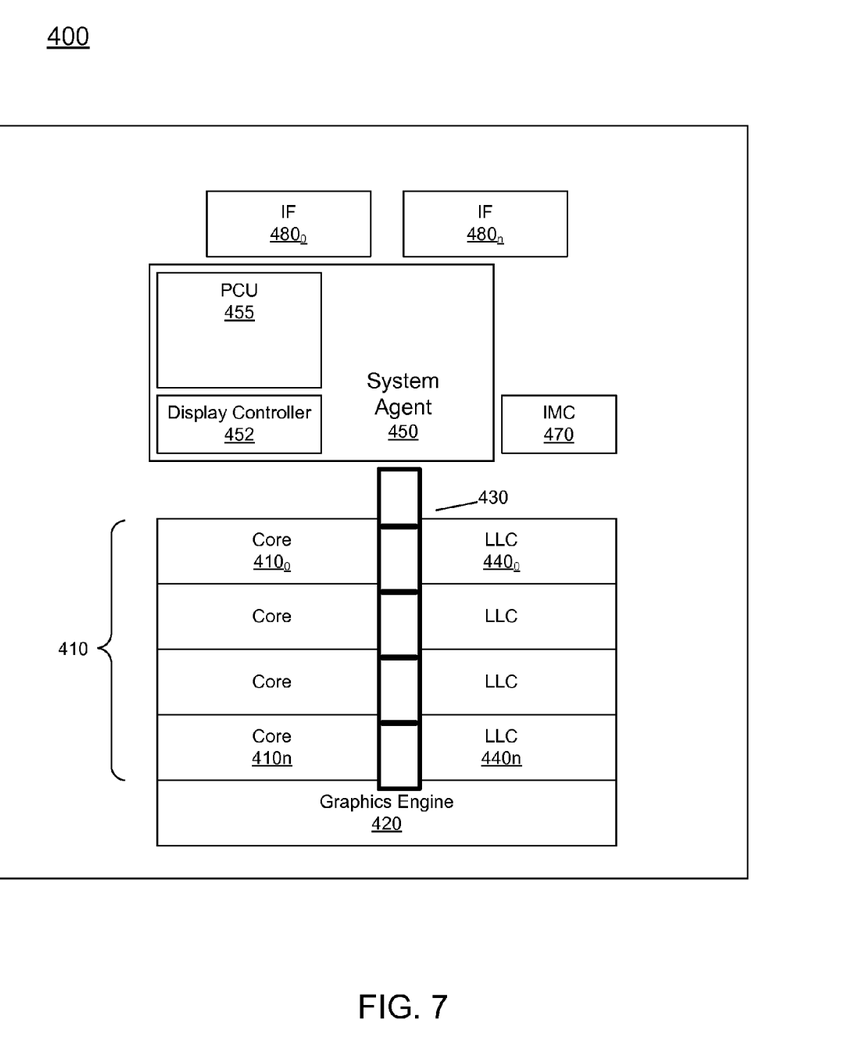
FIG. 7 is a block diagram of a multi-domain processor in accordance with an embodiment of the present invention.

Referring now to FIG. 7, shown is a block diagram of a multi-domain processor in accordance with an embodiment of the present invention of the present invention. As shown in the embodiment of FIG. 7, processor 400 includes multiple domains. Specifically, a core domain 410 can include a plurality of cores $410_0$-$410_n$, a graphics domain 420 can include one or more graphics engines, and a system agent domain 450 may further be present. In various embodiments, system agent domain 450 may execute at a fixed frequency and may remain powered on at all times to handle power control events and power management such that domains 410 and 420 can be controlled to dynamically enter into and exit low power states. Note that while only shown with three domains, understand the scope of the present invention is not limited in this regard and additional domains can be present in other embodiments. For example, multiple core domains may be present each including at least one core.

In general, each core 410 may further include low level caches in addition to various execution units such as an FMA unit in accordance with an embodiment of the present invention and additional processing elements. In turn, the various cores may be coupled to each other and to a shared cache memory formed of a plurality of units of a last level cache (LLC) $440_0$-$440_n$. In various embodiments, LLC 450 may be shared amongst the cores and the graphics engine, as well as various media processing circuitry. As seen, a ring interconnect 430 thus couples the cores together, and provides interconnection between the cores, graphics domain 420 and system agent circuitry 450.

In the embodiment of FIG. 7, system agent domain 450 may include display controller 452 which may provide control of and an interface to an associated display. As further seen, system agent domain 450 may include a power control unit 455 which can perform power management for a system in which the processor is located As further seen in FIG. 7, processor 400 can further include an integrated memory controller (IMC) 470 that can provide for an interface to a system memory, such as a dynamic random access memory (DRAM). Multiple interfaces $480_0$-$480_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 7, understand the scope of the present invention is not limited in this regard.

Figure 8:
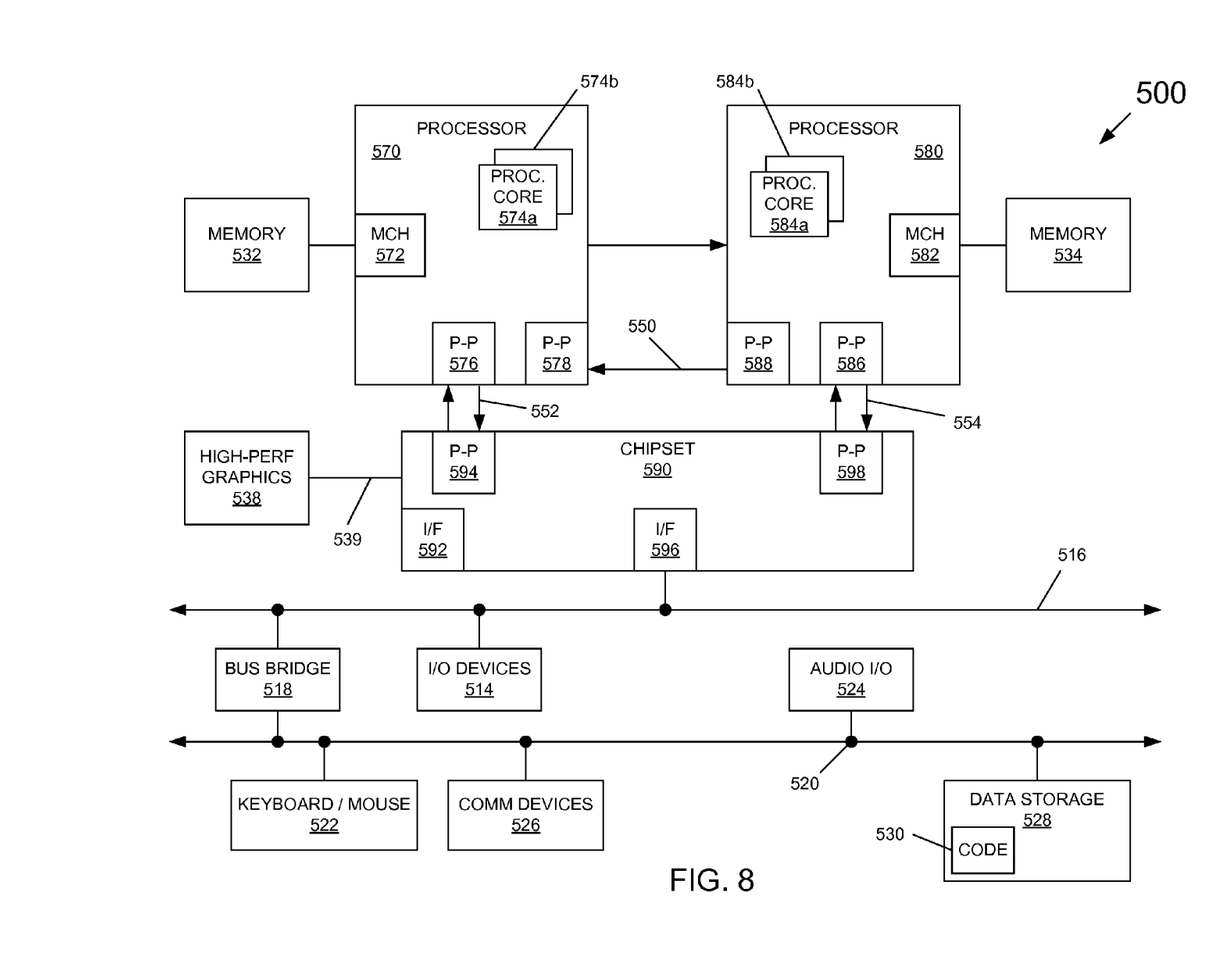
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 500 is a point-to-point interconnect system, and includes a first processor 570 and a second processor 580 coupled via a point-to-point interconnect 550. As shown in FIG. 8, each of processors 570 and 580 may be multicore processors, including first and second processor cores (i.e., processor cores 574a and 574b and processor cores 584a and 584b), although potentially many more cores may be present in the processors. Each of the cores can include a FMA unit that includes independently controllable adder portions, as described herein.

Still referring to FIG. 8, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 8, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 8, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 8, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a core including a plurality of execution units to execute instructions, the plurality of execution units including a fused multiply-add (FMA) unit to perform FMA instructions and add-like instructions, the FMA unit including a multiplier and an adder coupled to an output of the multiplier, the adder of a width having a plurality of segments each independently controllable to be powered on or off, and a tracker coupled to the adder to cause all segments of the adder to be powered on during execution of a first instruction in the FMA unit following a FMA instruction, wherein the first instruction is not to use the all segments of the adder, and otherwise to cause a corresponding segment to be powered on only if the segment is to be used during execution of an instruction.

2. The processor of claim 1, wherein the tracker includes a plurality of tracker segments each associated with one of the plurality of adder segments.

3. The processor of claim 2, wherein a first tracker segment is to enable a first adder segment to perform a first add-like instruction and a second tracker segment is to enable a second adder segment to perform the first add-like instruction concurrently.

4. The processor of claim 3, wherein a width of the first and second adder segments is at least equal to a width of the first add-like instruction.

5. The processor of claim 1, wherein the FMA unit is of N-bit width, and the adder is formed of four segments, at least two of the segments each having a bit width greater than N/4 and at least one of the segments having a bit width less than N/4.

6. The processor of claim 5, wherein the two segments having the bit width greater than N/4 are to execute a dual precision add-like instruction, and the other two segments are to be powered off.

7. The processor of claim 1, wherein a first adder segment is to execute a first single precision add-like instruction and a second adder segment is to execute a second single precision add-like instruction concurrently, and a third adder segment and a fourth adder segment are to be clock gated.

8. The processor of claim 1, wherein the tracker is to cause the all segments to be powered on during the first instruction execution to clear the all segments.

9. A method comprising:
powering a first segment of an adder of a fused multiply-add (FMA) unit of a processor during execution of a first instruction in the FMA unit after execution of a FMA instruction in the FMA unit although the first instruction is not to use the first segment of the adder; and
powering off the first segment of the adder during execution of a next instruction following the first instruction if the next instruction is not to use the first segment of the adder.

10. The method of claim 9, further comprising powering off the first segment of the adder during the next instruction execution while a second segment of the adder is powered on, wherein the next instruction is to use the second segment of the adder.

11. The method of claim 9, wherein the first instruction and the next instruction comprise add-like instructions.

12. The method of claim 9, further comprising powering the first segment of the adder and a third segment of the adder during concurrent execution of a first add-like instruction and a second add-like instruction in the FMA unit, wherein at least a second segment of the adder is powered off during the concurrent execution.

13. The method of claim 9, further comprising: receiving the first instruction in a tracker associated with the first segment of the adder; and generating an enable signal to enable a clock signal to be provided to the first segment during execution of the first instruction, wherein the first instruction does not use the first segment.

14. The method of claim 13, further comprising: receiving the next instruction in the tracker; and not generating the enable signal to prevent the clock signal from being provided to the first segment during execution of the next instruction.

15. A system comprising:
a processor including a fused multiply-add (FMA) unit to perform FMA instructions and add-like instructions, wherein an adder of the FMA unit has a width including a plurality of segments each independently controlled by a logic, wherein the logic is to clock gate at least one segment of the adder during execution of an add-like instruction in another segment of the adder, the add-like instruction having a width less than a width of the FMA unit, after the at least one segment was powered on during execution of at least one add-like instruction following a FMA instruction although the first add-like instruction did not use the at least one segment.

16. The system of claim 15, wherein the adder includes four segments, two of the segments each having a bit width greater than N/4 and at least one other segment has a bit width less than N/4, the two segments having the bit width greater than N/4 to execute a dual precision add-like instruction while the other two segments are to be powered off.

17. The system of claim 16, wherein after execution of the dual precision add-like instruction each of the segments is to be powered on only if an instruction is to use the corresponding segment, until execution of a next FMA instruction.

18. The system of claim 15, wherein the adder comprises N bits and power consumption in the adder for execution of an add-like instruction of N/2 bits is no greater than power consumption of an adder having N/2 bits for execution of an add-like instruction of N/2 bits.

19. The system of claim 15, wherein the logic is to power the at least one segment during the add-like instruction execution to clear the at least one segment.

* * * * *